United States Patent
Yamashita et al.

(10) Patent No.: US 11,631,990 B2
(45) Date of Patent: Apr. 18, 2023

(54) POWER SUPPLY CONNECTION DEVICE

(71) Applicant: HONDA MOTOR CO., LTD., Tokyo (JP)

(72) Inventors: Tadashi Yamashita, Wako (JP); Yoshiaki Kotani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/668,952

(22) Filed: Feb. 10, 2022

(65) Prior Publication Data
US 2022/0285975 A1 Sep. 8, 2022

(30) Foreign Application Priority Data
Mar. 5, 2021 (JP) .............................. JP2021-035301

(51) Int. Cl.
*H02J 9/06* (2006.01)
*H02J 7/00* (2006.01)
*H02J 7/34* (2006.01)

(52) U.S. Cl.
CPC ............ *H02J 9/062* (2013.01); *H02J 7/0068* (2013.01); *H02J 7/34* (2013.01)

(58) Field of Classification Search
CPC .. H02J 9/062; H02J 7/0068; H02J 7/34; H02J 7/0042
USPC ........................................................... 307/66
See application file for complete search history.

(56) References Cited

U.S. PATENT DOCUMENTS

| | | | |
|---|---|---|---|
| 10,333,340 B2 * | 6/2019 | Kang | H02J 9/061 |
| 11,456,584 B1 * | 9/2022 | Taylor | H02G 3/088 |
| 2022/0297556 A1 * | 9/2022 | Higuchi | B60L 53/22 |

FOREIGN PATENT DOCUMENTS

JP 2013-039013 2/2013

\* cited by examiner

*Primary Examiner* — Richard Tan
(74) *Attorney, Agent, or Firm* — Rankin, Hill & Clark LLP

(57) ABSTRACT

A power supply connection device includes a connection box that connects a battery pack and an electric generator, and the connection box includes: a first connection part that is connected to the battery pack; a second connection part that is connected to the electric generator; a first circuit that connects a commercial power supply and the second connection part; and a second circuit that connects the first connection part and the second connection part upon detection of a power outage.

3 Claims, 6 Drawing Sheets

POWER SUPPLY CONNECTION DEVICE

INCORPORATION BY REFERENCE

The present application claims priority under 35 U.S.C. § 119 to Japanese Patent Application No. 2021-035301 filed on Mar. 5, 2021. The content of the application is incorporated herein by reference in its entirety.

BACKGROUND OF THE INVENTION

Field of the Invention

The present invention relates to a power supply connection device including a connection box.

Description of the Related Art

Conventionally, there is proposed a power generation system in which electricity is generated by driving an electric generator with an engine with the electric generator connected to a battery pack and a commercial power supply, and the output is assisted by the battery pack or the commercial power supply as a need arises.

Moreover, an uninterruptible power supply device (UPS) for switching from a commercial power supply to a battery power supply in the event of a power outage has been known (see, for example, Japanese Patent Laid-Open No. 2013-39013).

SUMMARY OF THE INVENTION

Problem to be Solved by the Invention

However, according to a conventional configuration, when an uninterruptible power supply device (UPS) is employed with respect to an electric generator, it is difficult for a general user to set up the UPS, and a service person is needed, and thus setting takes effort and time.

Therefore, it is the purpose of the present invention to provide a power supply connection device capable of solving the above-mentioned problem, and easily connecting the UPS to the electric generator.

Means for Solving the Problem

An aspect of the present invention is a power supply connection device including a connection box that connects a battery pack and an electric generator, wherein the connection box includes: a first connection part that is connected to the battery pack; a second connection part that is connected to the electric generator; a first circuit that connects a commercial power supply and the second connection part; and a second circuit that connects the first connection part and the second connection part upon detection of a power outage.

Advantageous Effect of the Invention

According to the aspect of the present invention, the power supply connection device includes the connection box that connects the battery pack and the electric generator, and is capable of easily coupling a UPS to the electric generator by just connecting the first connection part of the connection box to the battery pack and connecting the second connection part of the connection box to the electric generator.

DETAILED DESCRIPTION OF THE PREFERRED EMBODIMENT

Hereinafter, one embodiment of the present invention will be described based on the attached drawings.

Figure 1:
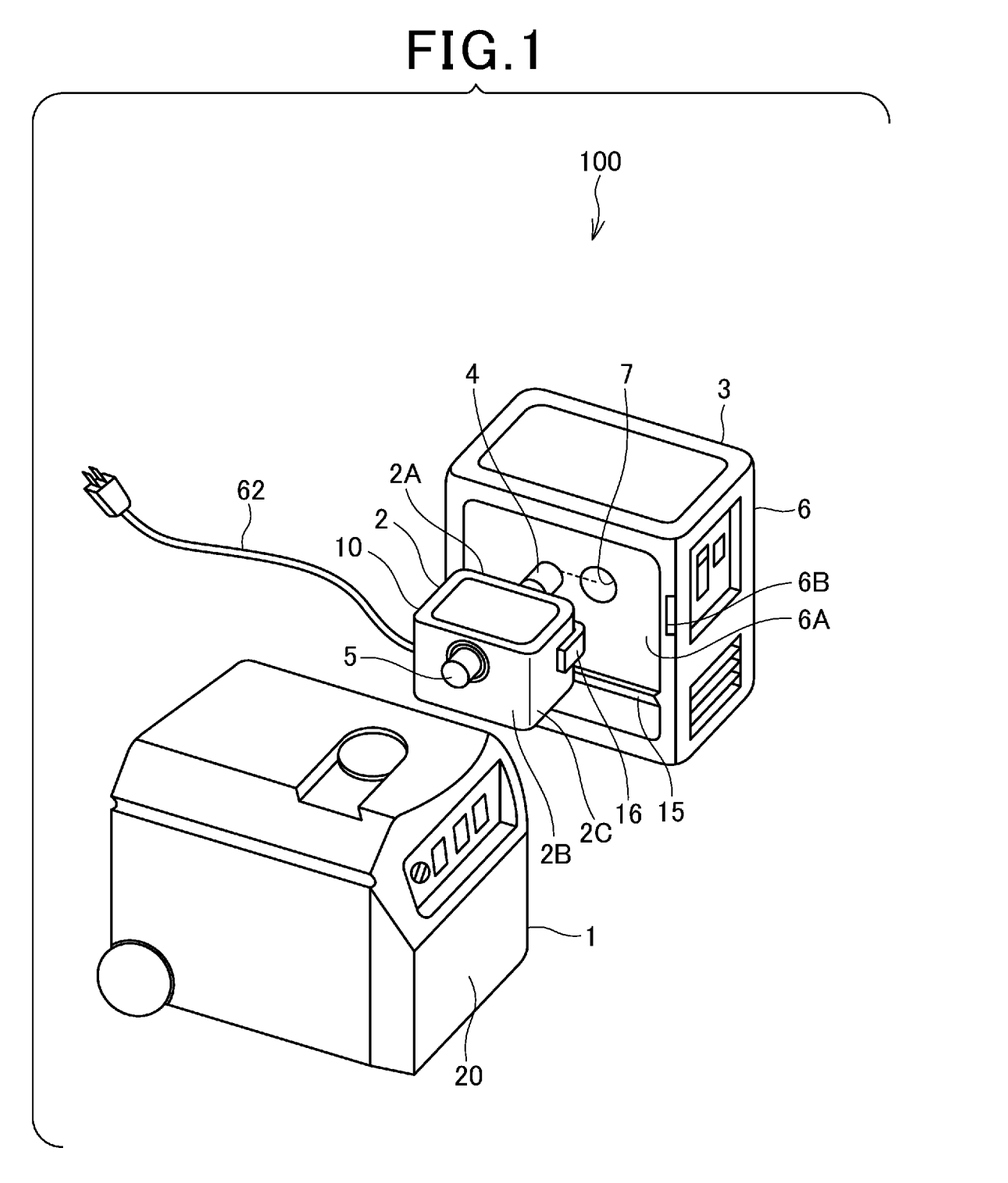
FIG. 1 is a view showing a power generation device according to an embodiment of the present invention.

FIG. 1 is a view showing a configuration of a hybrid power generation device 100.

The power generation device 100 corresponds to one example of a power supply connection device.

This power generation device 100 includes an electric generator 1, a battery pack 3, and a connection box 2 for coupling the electric generator 1 and the battery pack 3.

Figure 2:
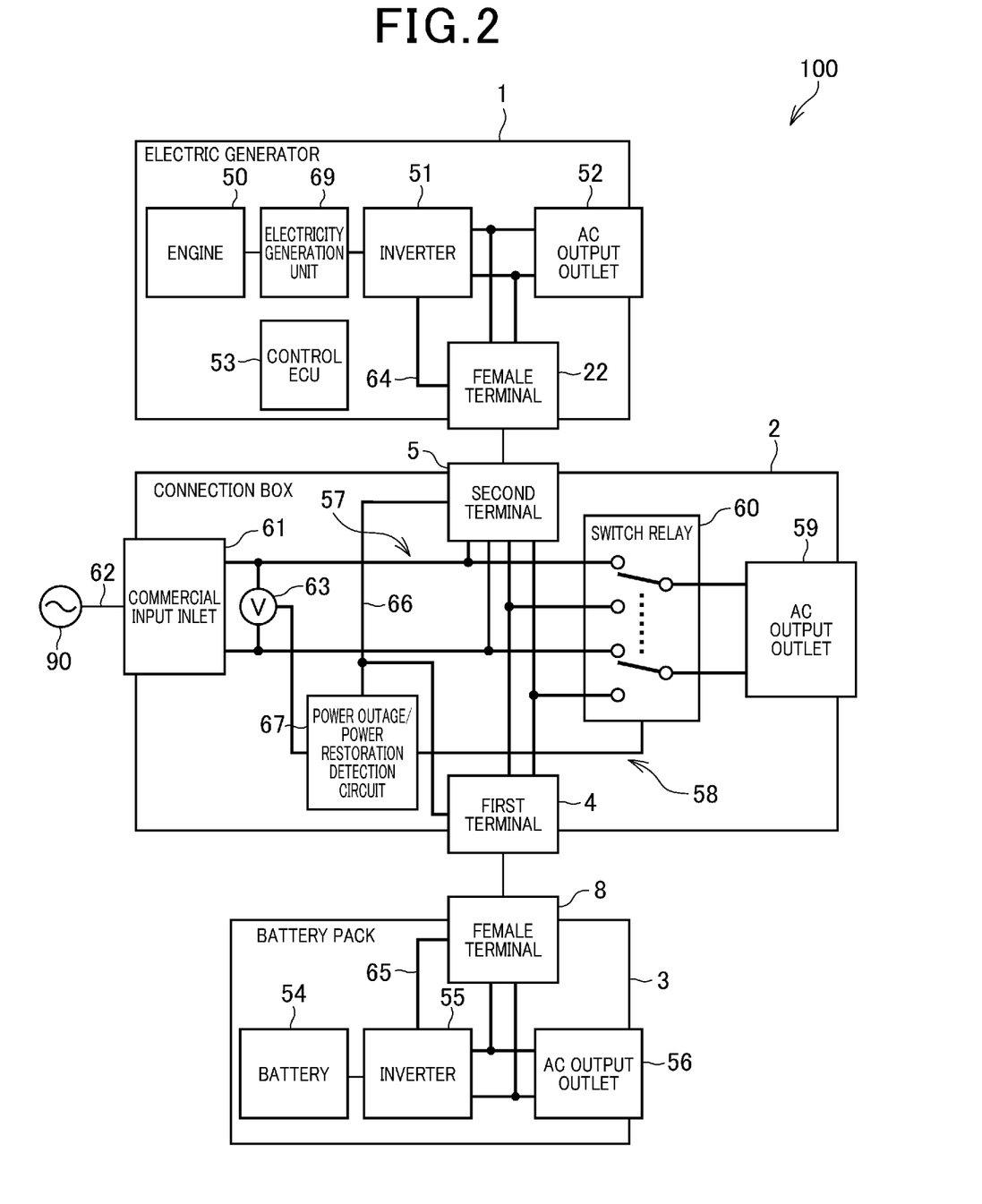
FIG. 2 is a view showing a circuit configuration of the power generation device.

FIG. 2 is a view showing a circuit configuration of the power generation device 100.

The electric generator 1 includes an engine 50, an electricity generation unit 69 as an alternator, an inverter 51, an AC output outlet 52, a later-described female terminal 22 functioning as a relay connection socket, and a control ECU 53 including a processor and a memory. A load, which is desired to be connected in the event of a power outage of a commercial power supply 90, is connected to the AC output outlet 52. The inverter 51 and the female terminal 22 are connected with a signal line 64.

The battery pack 3 includes a battery 54, an inverter 55, an AC output outlet 56, and a later-described female terminal 8 functioning as a relay connection socket. The inverter 55 and the female terminal 8 are connected with a signal line 65.

The connection box 2 includes a first connection part (hereinafter referred to as the first terminal) 4 that is a male terminal to be connected to the female terminal 8 of the battery pack 3, and a second connection part (hereinafter referred to as the second terminal) 5 that is a male terminal to be connected to the female terminal 22 of the electric generator 1. The first terminal 4 and the second terminal 5 are connected to each other with a signal line 66.

The connection box 2 includes a first circuit 57 that connects the commercial power supply 90 to the second terminal 5. The first circuit 57 is connected to the commercial power supply 90 through a power supply cord 62 which is connected to a commercial input inlet 61. 63 represents a voltmeter that measures the voltage of the first circuit 57.

The connection box 2 includes a second circuit 58 for switching from the connection of the commercial power supply 90 to the second terminal 5 to the connection of the first terminal 4 to the second terminal 5 in the event of a power outage. The second circuit 58 constitutes a so-called uninterruptible power supply device (UPS).

The second circuit 58 includes a switch relay 60, and a power outage/power restoration detection circuit 67. The power outage/power restoration detection circuit 67 is connected to the signal line 66 between the first terminal 4 and the second terminal 5. The power outage/power restoration detection circuit 67 is connected to the voltmeter 63, and detects a power outage of the commercial power supply 90, and power restoration by acquiring a measurement value of the voltmeter 63.

The switch relay 60 is in the position shown in FIG. 2 when power is restored, and the commercial power supply 90 is connected to the second terminal 5 and an AC output outlet 59 with the switch relay 60. When the second circuit 58 detects a power outage, the switch relay 60 is switched, and the battery pack 3 is connected to the second terminal 5 and the AC output outlet 59. Note that an appropriate load (not shown) is connected to the AC output outlet 59. In the event of power restoration, the second circuit 58 disconnects the first terminal 4 and the second terminal 5, and connects to the first circuit 57.

In this power generation device 100, the electric generator 1 is driven by the engine 50 to output generated electricity, and it is also possible to provide output assist by the commercial power supply 90, and provide output assist by the battery pack 3. Moreover, even in a state in which the engine 50 is stopped, it is possible to provide output assist by the commercial power supply 90, or by the battery pack 3.

Furthermore, since the second circuit 58 is present, even when there is a power outage of the commercial power supply 90, it is possible to provide output assist by the battery pack 3.

For example, it is possible to drive the electricity generation unit 69 as a starter motor of the engine 50 by electricity supplied from the battery pack 3 through the connection box 2, thereby starting the engine 50.

Regarding operation modes of the power generation device 100, there are a parallel operation capable of supplying electricity from both of the electric generator 1 and the battery pack 3, and a load assist operation in which a priority is basically given to the engine 50 for output, and the battery pack 3 provides output assist in the event of overload. Moreover, as other operation mode of the power generation device 100, there is a range extender operation that switches three output methods: only output from the battery pack 3; only output from the electric generator 1; or output from both of the battery pack 3 and the electric generator 1, according to an load amount. In the power generation device 100, an operation mode is automatically selected from such a variety of operation modes. In the present embodiment, selecting of these operation modes is implemented based on communications between the electric generator 1 and the battery pack 3 through the signal lines 64, 65, 66. In short, the connection box 2 connects the electric generator 1 and the battery pack 3 to enable communications.

As shown in FIG. 1, the battery pack 3 includes a case 6, and a guide member 15 formed in a side surface portion 6A of the case 6 to extend in a horizontal direction. The guide member 15 is provided for positioning the top and bottom of the connection box 2. Moreover, the side surface portion 6A of the case 6 is provided with an engagement portion 6B in the form of a groove.

The connection box 2 is disposed between the electric generator 1 and the battery pack 3. The connection box 2 has, on one side surface 2A, the first terminal 4 to be connected to the battery pack 3, and has, on other side surface 2B, the second terminal 5 to be connected to the electric generator 1. The other side surface 2B is a surface on the opposite side to the one side surface 2A in the connection box 2.

A hook member 16 that engages with the battery pack 3 is mounted to other side surface 2C of the connection box 2. The hook member 16 is engageable with the engagement portion 6B of the battery pack 3, and couples the battery pack 3 and the connection box 2.

Figure 3:
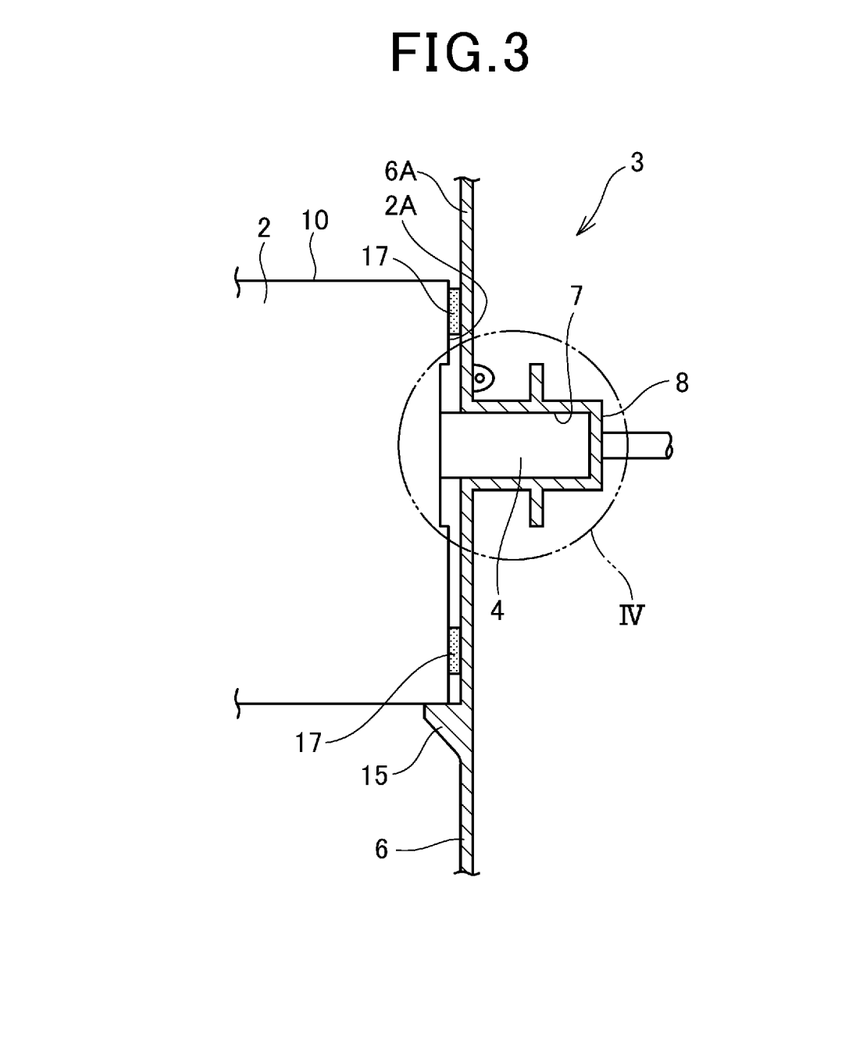
FIG. 3 is a sectional view showing a coupling structure of the battery pack and the connection box.

FIG. 3 is a sectional view showing a coupling structure of the battery pack 3 and the connection box 2.

Figure 4:
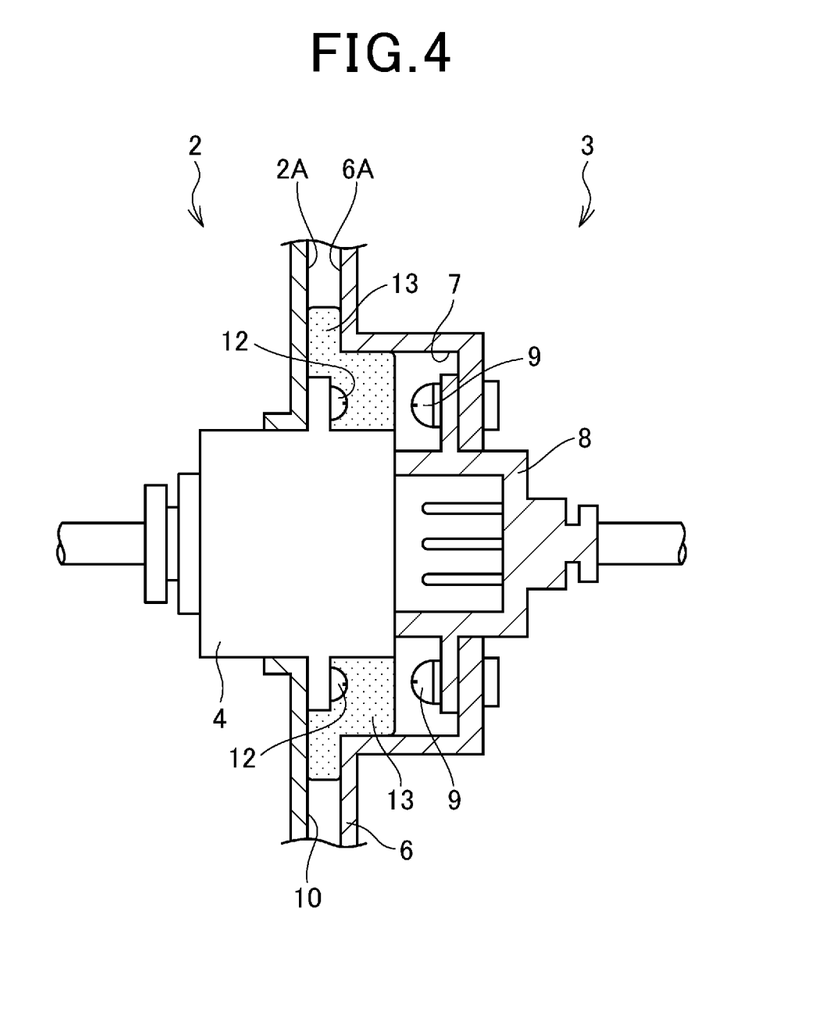
FIG. 4 is a view showing a range of IV of FIG. 3.

FIG. 4 is a view showing a range of IV of FIG. 3.

As shown in FIG. 3, a recess 7 is formed on the side surface portion 6A of the case 6 of the battery pack 3. As shown in FIG. 4, the female terminal 8 as an exclusive outlet is disposed in the recess 7, and the female terminal 8 is secured to the recess 7 with two vis screws 9.

The connection box 2 includes a case 10. The first terminal (male terminal) 4 to be connected to the female terminal 8 of the battery pack 3 is secured to the one side surface 2A of the case 10. The first terminal 4 is secured to the one side surface 2A with two vis screws 12. A seal member 13 made of rubber is fitted around the outer circumference of the first terminal 4, and the seal member 13 tightly seals between the side surface portion 6A of the battery pack 3 and the one side surface 2A of the connection box 2.

Figure 5:
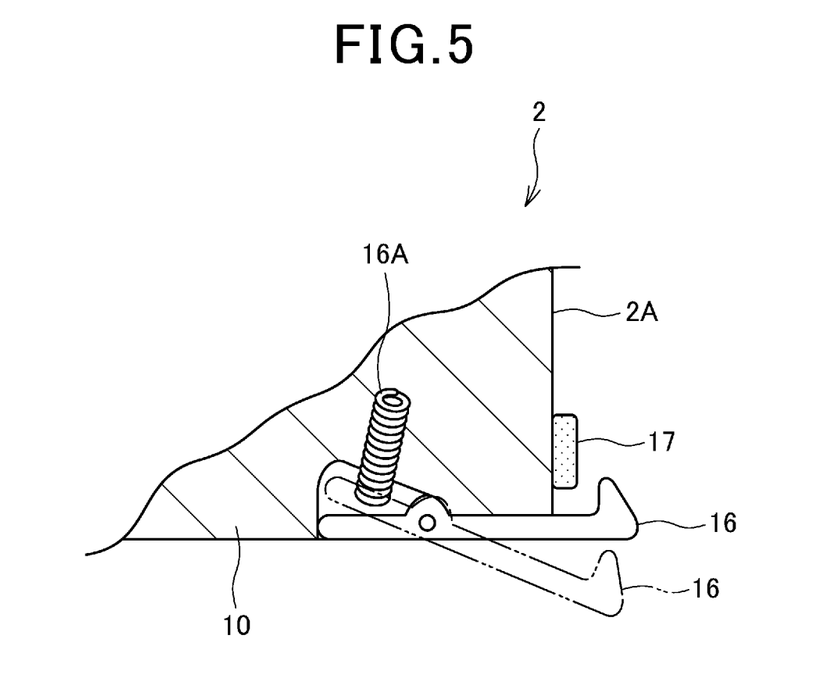
FIG. 5 is a cross-sectional view of the connection box, and shows a hook member.

FIG. 5 is a cross-sectional view of the connection box 2, and shows the hook member 16.

As shown in FIG. 3, when connecting the battery pack 3 and the connection box 2, in a state in which a buffer material 17 is interposed between the case 6 of the battery pack 3 and the case 10 of the connection box 2, the connection box 2 is placed on the guide member 15. Then, the top and bottom positions of the connection box 2 are registered relative to the battery pack 3, and the first terminal 4 and the female terminal 8 are connected.

Next, as shown in FIG. 5, the hook member 16 is rotated and hooked with the engagement portion 6B of the battery pack 3, thereby connecting the battery pack 3 and the connection box 2. 16A represents a coil spring which biases the hook member 16 toward the connection box 2.

Figure 6:
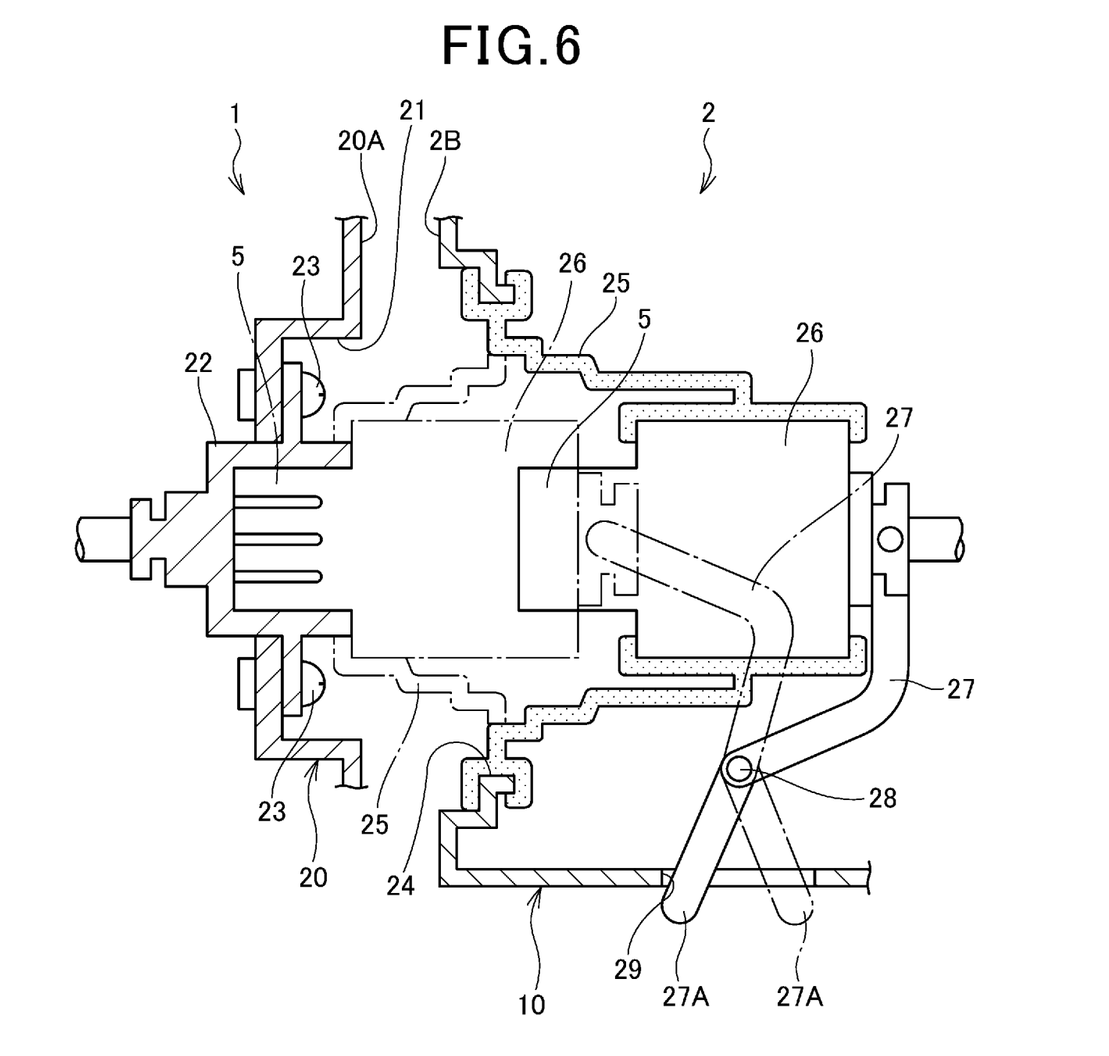
FIG. 6 is a sectional view showing a coupling structure of the electric generator and the connection box.

FIG. 6 is a view showing a coupling structure of the connection box 2 and the electric generator 1.

The electric generator 1 includes a case 20, and a recess 21 is formed on a side surface portion 20A of the case 20. A female terminal 22 as an exclusive outlet is disposed in the recess 21, and the female terminal 22 is secured to the recess 21 with two vis screws 23.

An opening 24 is formed on the other side surface 2B of the case 10 of the connection box 2. A stretchable rubber member 25 formed in a recessed shape is attached to the opening 24, and an fitting portion 26 is formed in the back of the rubber member 25. The second terminal (male terminal) 5 is fitted into the fitting portion 26. The second terminal 5 is connected to the female terminal 22 of the electric generator 1.

A biasing lever 27 is connected to a base portion 25A of the rubber member 25. The biasing lever 27 swings on a shaft 28 as the center of rotation. The shaft 28 is supported by the case 10 of the connection box 2. An operating end 27A of the biasing lever 27 penetrates a through-hole 29 formed on the case 10 of the connection box 2, and projects out of the case 10.

Next, a procedure for coupling the connection box 2 and the electric generator 1 will be described.

As shown in FIG. 3 to FIG. 5, after coupling the battery pack 3 to the connection box 2, the connection box 2 integrated with the battery pack 3 is moved toward the electric generator 1. Then, as shown in FIG. 6, the axial center of the female terminal 22 of the electric generator 1 and the axial center of the second terminal 5 of the connection box 2 are aligned with each other.

In the present embodiment, the coupled body of the battery pack 3 and the connection box 2 is formed, and the second circuit 58 is incorporated in the connection box 2, and therefore it is possible to easily couple the battery pack 3 and the uninterruptible power supply device (UPS).

Next, the operating end 27A of the biasing lever 27 is operated to rotationally move counterclockwise about the shaft 28. With this operation, as shown by imaginary line represented by the alternate long and short dash line in FIG. 6, the rubber member 25 is biased toward the electric generator 1, the second terminal 5 integrated with the rubber member 25 is biased toward the electric generator 1, and the second terminal 5 of the connection box 2 is connected to the female terminal 22 of the electric generator 1.

Functions of the present embodiment will be described.

If there is no commercial power supply 90, for example, when this power generation device 100 is used outside, the power generation device 100 is operated in two ways: to drive the electric generator 1 by the engine 50 and output generated electricity, or to output electricity charged in the battery pack 3.

Moreover, if there is the commercial power supply 90, as shown in FIG. 1, it is possible to use the power generation device 100 by connecting the power supply cord 62 of the connection box 2 to the commercial power supply 90.

At this time, the power generation device 100 is operated in three ways: to drive the electric generator 1 by the engine 50 and output generated electricity; to output electricity from the commercial power supply 90, or to output electricity charged in the battery pack 3.

When a power outage occurs while the power generation device 100 is operated with the commercial power supply 90, the second circuit (UPS) 58 incorporated in the connection box 2 operates to switch from the commercial power supply 90 to the power supply of the battery pack 3.

In the present embodiment, it is possible to couple the electric generator 1 and the uninterruptible power supply device (UPS) by just coupling the battery pack 3 and the connection box 2, and a general user can set up the UPS of the power generation device 100 without taking a lot of time.

According to the present embodiment, the power generation device 100 includes the connection box 2 that connects the battery pack 3 and the electric generator 1. This connection box 2 includes: the first terminal 4 that is connected to the battery pack 3; the second terminal 5 that is connected to the electric generator 1; the first circuit 57 that connects the commercial power supply 90 and the second terminal 5; and the second circuit 58 that connects the first terminal 4 and the second terminal 5 upon detection of a power outage.

Thus, in the power generation device 100, it is possible to easily couple the battery pack 3 and the second circuit 58 by just connecting the first terminal 4 of the connection box 2 to the battery pack 3 and connecting the second terminal 5 to the electric generator 1. Moreover, in the power generation device 100, it is possible to connect the battery pack 3 and the connection box 2 without a tool. In other words, since the electric generator 1, the battery pack 3 and the second circuit 58 can be connected using the exclusive outlet of the connection box 2, wiring is not required, and the connections are facilitated.

Further, in the present embodiment, the connection box 2 includes the hook member 16.

Therefore, after connecting the first terminal 4 of the connection box 2 to the battery pack 3, it is possible to firmly secure the battery pack 3 to the connection box 2 by operating the hook member 16.

Furthermore, in the present embodiment, as shown in FIG. 3, the first terminal 4 is connected to the battery pack 3 through the seal member 13.

Therefore, since the seal member 13 tightly seals between the side surface portion 6A of the battery pack 3 and the one side surface 2A of the connection box 2, infiltration of rainwater is prevented, for example, and the power generation device 100 can withstand outdoor use.

Additionally, in the present embodiment, as shown in FIG. 6, the second terminal 5 is supported by the rubber member 25, and is configured to be biased integrally with the rubber member 25 toward the electric generator 1 and connected to the electric generator 1 by the operation of the biasing lever 27.

Thus, since the second terminal 5 is supported by the rubber member 25, the mount position is adjusted, and vibrations of the electric generator 1 are absorbed.

Moreover, the rubber member 25 is displaced and allows the second terminal 5 to move up and down and left and right, thereby facilitating centering of the female terminal 22 of the electric generator 1 and the second terminal 5, and connecting of the female terminal 22 of the electric generator 1 and the second terminal 5.

Further, the biasing lever 27 is connected to the base portion 25A of the rubber member 25, and the operating end 27A of the biasing lever 27 projects out of the connection box 2.

Therefore, since the second terminal 5 is biased toward the electric generator 1 by rotationally moving the operating end 27A of the biasing lever 27, it is easy to connect the second terminal 5 of the connection box 2 to the female terminal 22 of the electric generator 1.

Furthermore, in the present embodiment, the second circuit 58 includes the power outage/power restoration detection circuit 67, and, upon detection of power restoration of the commercial power supply 90, disconnects the first terminal 4 and the second terminal 5, and connects to the first circuit 57.

Thus, when power restoration of the commercial power supply 90 is detected, the commercial power supply 90 and the second terminal 5 are automatically connected.

The embodiment described above shows one aspect of the present invention as an example, and any modification and application can be made within a range not departing from the gist of the present invention.

Although not shown in the drawings, a plurality of other battery packs 3 may be connected in series, or in parallel, to the battery pack 3 coupled to the connection box 2. For example, any number of battery packs 3 may be connected to the electric generator 1 according to the user's purpose of use.

Moreover, when the electric generator 1 has high power and the electric generator 1 cannot be started by itself, it is possible to start the electric generator 1 by connecting some battery packs 3 in parallel. When the power generation device 100 is operated, the connections of the battery packs 3 may be switched according to a required output.

Further, when the remaining battery level of one of the battery packs 3 is low, the battery pack 3 may switch from an output mode to a charge mode, and be charged gradually from the surplus power of the electric generator 1.

For example, if the hybrid power generation device 100 of FIG. 1 is applied in the event of disasters, long time continuous operation is possible in an optimum operation mode by using gasoline or electricity from the battery 54 depending on the need. For example, in a case where the electric generator 1 is operated, when only rated power or less is actually used, it is possible to charge the surplus electricity to the battery pack 3 which requires charging, and consequently, the battery 54 always has an enough charge level in the power generation device 100, thereby coping with an unexpected situation.

Furthermore, in the power generation device 100, by using the battery 54 as a power source, the engine 50 and the battery 54 are operated in parallel depending on the magnitude of output, thereby reducing the amount of $CO_2$ emissions. The battery pack 3 has low noise, and can reduce environmental burden. When an auxiliary battery is mounted to a high-power electric generator 1, the electric generator 1 becomes larger and heavier. By linking the electric generator 1 and the battery pack 3 as in the power generation device 100, an auxiliary battery is not required for the electric generator 1, thereby achieving a reduction in the size and weight of the electric generator 1.

REFERENCE SIGNS LIST

1 Electric generator
2 Connection box
2A One side surface
2B, 2C Other side surface
3 Battery pack
4 First terminal (first connection part)
5 Second terminal (second connection part)
8, 22 Female terminal
13 Seal member
15 Guide member
16 Hook member
18 Engagement piece
25 Rubber member
27 Biasing lever
27A Operating end
49 Connection cable
57 First circuit
58 Second circuit (uninterruptible power supply device)
67 Power outage/power restoration detection circuit
90 Commercial power supply
100 Power generation device (power supply connection device)

What is claimed is:

1. A power supply connection device comprising a connection box that connects a battery pack and an electric generator, wherein
    the connection box comprises: a first connection part that is connected to the battery pack; a second connection part that is connected to the electric generator; a first circuit that connects a commercial power supply and the second connection part; and a second circuit that connects the first connection part and the second connection part upon detection of a power outage,
    the connection box is disposed in use between the electric generator and the battery pack, the connection box has the first connection part on one side surface which is at the battery pack side, and the connection box has the second connection part on other side surface which is at the electric generator side and which is a surface on an opposite side to the one side surface,
    the first connection part is a terminal to be directly connected to a terminal of the battery pack,
    the second connection part is a terminal to be directly connected to a terminal of the electric generator,
    the connection box includes a hook member which is operated in a state that the first connection part is connected to the terminal of the battery pack and which engages with the battery pack,
    an opening is formed on the other side surface of the connection box, a rubber member is attached to the opening, and the second connection part is supported by the rubber member and is biased integrally with the rubber member toward the electric generator and connected to the terminal of the electric generator by operation of a biasing lever.

2. The power supply connection device according to claim 1, wherein the first connection part is connected to the battery pack through a seal member.

3. The power supply connection device according to claim 1, wherein the second circuit includes a power outage/power restoration detection circuit, and, upon detection of power restoration, disconnects the first connection part and the second connection part, and connects to the first circuit.

* * * * *